United States Patent
Bhati et al.

(10) Patent No.: US 10,331,582 B2
(45) Date of Patent: Jun. 25, 2019

(54) WRITE CONGESTION AWARE BYPASS FOR NON-VOLATILE MEMORY, LAST LEVEL CACHE (LLC) DROPPING FROM WRITE QUEUE RESPONSIVE TO WRITE QUEUE BEING FULL AND READ QUEUE THRESHOLD WHEREIN THE THRESHOLD IS DERIVED FROM LATENCY OF WRITE TO LLC AND MAIN MEMORY RETRIEVAL TIME

(71) Applicant: INTEL CORPORATION, Santa Clara, CA (US)

(72) Inventors: Ishwar S. Bhati, Bangalore (IN); Huichu Liu, San Jose, CA (US); Jayesh Gaur, Bengaluru (IN); Kunal Korgaonkar, Goa (IN); Sasikanth Manipatruni, Hillsboro, OR (US); Sreenivas Subramoney, Bangalore (IN); Tanay Karnik, Portland, OR (US); Hong Wang, Santa Clara, CA (US); Ian A. Young, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 138 days.

(21) Appl. No.: 15/430,765

(22) Filed: Feb. 13, 2017

(65) Prior Publication Data
US 2018/0232311 A1    Aug. 16, 2018

(51) Int. Cl.
G06F 13/16 (2006.01)
G06F 12/0811 (2016.01)
(52) U.S. Cl.
CPC ...... *G06F 13/1642* (2013.01); *G06F 12/0811* (2013.01)

(58) Field of Classification Search
CPC combination set(s) only.
See application file for complete search history.

(56) References Cited

U.S. PATENT DOCUMENTS

| 4,077,059 A * | 2/1978 | Cordi | G06F 12/0866 |
| | | | 707/999.202 |
| 5,948,081 A * | 9/1999 | Foster | G06F 13/1642 |
| | | | 710/25 |

(Continued)

OTHER PUBLICATIONS

W. Xu, H. Sun, X. Wang, Y. Chen and T. Zhang, "Design of Last-Level On-Chip Cache Using Spin-Torque Transfer RAM (STT RAM)," in IEEE Transactions on Very Large Scale Integration (VLSI) Systems, vol. 19, No. 3, pp. 483-493, Mar. 2011.*

(Continued)

*Primary Examiner* — Rocio Del Mar Perez-Velez
*Assistant Examiner* — Chie Yew
(74) *Attorney, Agent, or Firm* — Lowenstein Sandler LLP

(57) ABSTRACT

A processor includes a processing core and a cache controller including a read queue and a separate write queue. The read queue is to buffer read requests of the processing core to a non-volatile memory, last level cache (NVM-LLC), and the write queue is to buffer write requests to the NVM-LLC. The cache controller is to detect whether the write queue is full. The cache controller further prioritizes a first order of sending requests to the NVM-LLC when the write queue contains an empty slot, the first order specifying a first pattern of sending the read requests before the write requests, and prioritizes a second order of sending requests to the NVM-LLC in response to a determination that the write queue is full, the second order specifying a second pattern of alternating between sending a write request from the write queue and a read request from the read queue.

20 Claims, 12 Drawing Sheets

(56) References Cited

U.S. PATENT DOCUMENTS

| | | | | |
|---|---|---|---|---|
| 2003/0177320 A1* | 9/2003 | Sah | .................... | G06F 12/0813 |
| | | | | 711/158 |
| 2009/0024796 A1* | 1/2009 | Nychka | ............... | G06F 12/0811 |
| | | | | 711/122 |
| 2017/0315914 A1* | 11/2017 | Muralimanohar | .. | G06F 12/0806 |

OTHER PUBLICATIONS

Gaur et al., "Bypass and Insertion Algorithms for Exclusive Last-level Caches," 12 pages, ISCA'11, Jun. 4-8, 2011.
Khan et al., "Sampling Dead Block Prediction for Last-Level Caches," 12 pages, 43rd Annual IEEE/ACM International Symposium on Microarchitecture (MICRO-43), Dec. 2010.
Ahn et al., "DASCA: Dead Write Prediction Assisted STT-RAM Cache Architecture," 12 pages, HPCA, IEEE, Feb. 15-19, 2014.

* cited by examiner

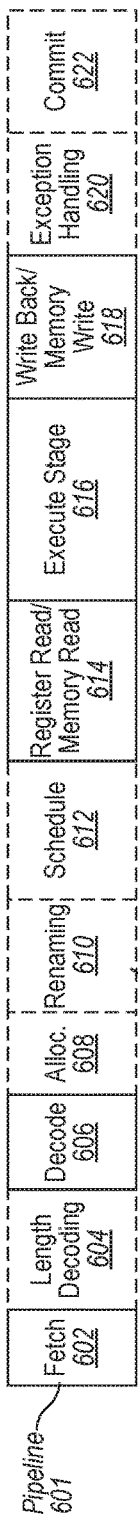
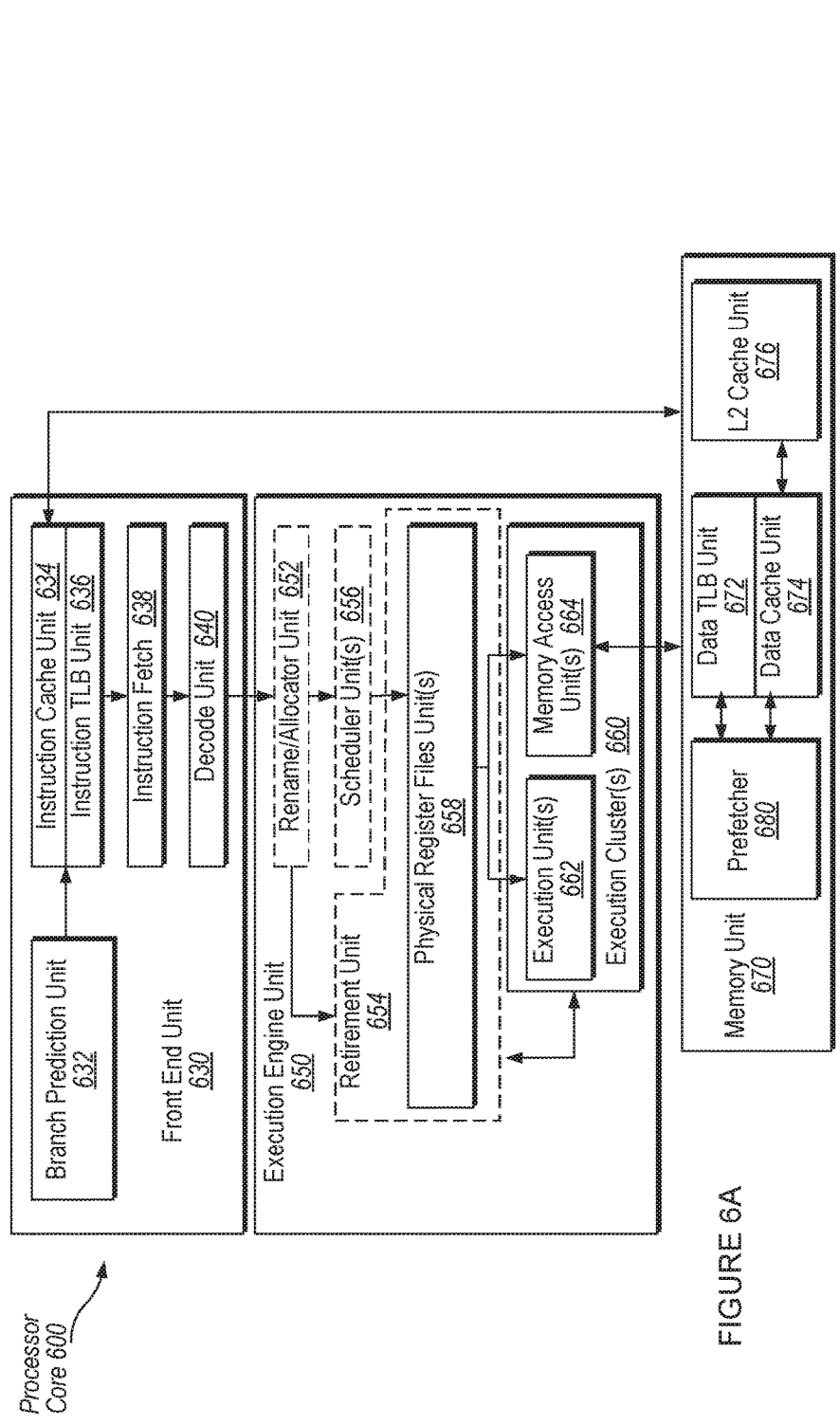
FIGURE 6B
FIGURE 6A

WRITE CONGESTION AWARE BYPASS FOR NON-VOLATILE MEMORY, LAST LEVEL CACHE (LLC) DROPPING FROM WRITE QUEUE RESPONSIVE TO WRITE QUEUE BEING FULL AND READ QUEUE THRESHOLD WHEREIN THE THRESHOLD IS DERIVED FROM LATENCY OF WRITE TO LLC AND MAIN MEMORY RETRIEVAL TIME

TECHNICAL FIELD

The present disclosure relates to processor caching architecture, and in particular, to write congestion aware bypass for non-volatile memory, last level cache (NVM-LLC).

BACKGROUND

With ever-increasing memory footprints of current and future applications, larger caches provide substantial performance gains in each processor generation. Due to high power leakage and area, the size of static random access memory (SRAM)-based last level cache (LLC) may be limited. Recent non-volatile memory (NVM) technologies, like Spin Hall Effect (SHE) MRAM or Spin Transfer Torque Magnetic RAM (STTRAM), as examples, have emerged as promising alternatives for SRAM-LLC. These memories have significant capacity and power advantages as compared to SRAM, e.g., STTRAM is shown to have ten times lower power leakage and four times lower area consumption compared to SRAM. However, NVM-LLC may have higher write latency than write latency in SRAM-LLC. In NVM-LLC, read requests often wait in queues for high-latency write operations to finish, resulting in performance loss even with higher-capacity NVM-LLC.

BRIEF DESCRIPTION OF THE DRAWINGS

FIG. 6A is a block diagram illustrating an in-order pipeline and a register renaming stage, out-of-order issue/execution pipeline according to one embodiment.

FIG. 6B is a block diagram illustrating a micro-architecture for a processor or an integrated circuit for performing caching in the processor or integrated circuit, according to an embodiment of the present disclosure.

DESCRIPTION OF EMBODIMENTS

Figure 1:
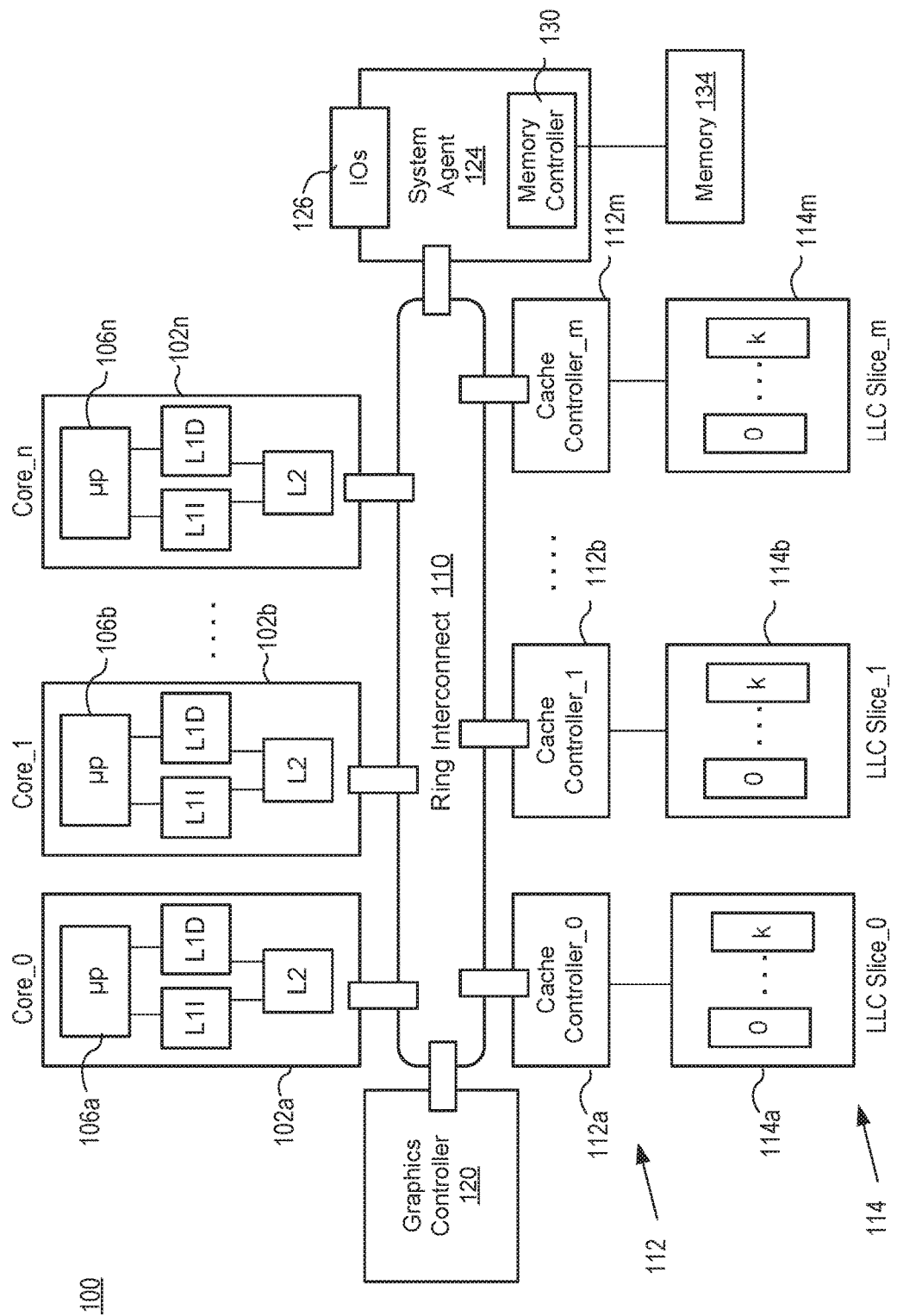
FIG. 1 is a block diagram of an integrated circuit with NVM-LLC, according to an embodiment of the present disclosure.

As discussed, the above-mentioned NVM technologies suffer from high write latency and hence any NVM-LLC would be asymmetric, with much higher write latency (in the range of 10-40 ns) compared to read latency. This high write latency can degrade performance by causing write-induced interference to subsequent latency-sensitive read operations. Additionally, the high write latency pressures the LLC request queues, which creates backpressure on the core L1/L2 caches and can stall the core. These features limit the performance potential of LLCs built on NVM technologies.

The write latency can be addressed by upsizing the write access transistors at the circuit level or by using heavily-banked LLCs. These approaches, however, may result in higher overall power and lower density, thereby negating the density advantage offered by these NVM technologies. The embodiments described herein may provide low-cost architectural solutions to mitigate the impact of higher write latency in NVM-LLC, and leverage the larger capacity for actual performance increases.

In one embodiment, split-request queue architecture is employed to give priority to demand of read requests over write requests. Write requests are served opportunistically, thus minimally impacting the read requests. More specifically, a unified-request queue may be split into separate read and write queues. A cache controller may, therefore, prioritize a first order of sending requests to the NVM-LLC when the write queue contains an empty slot, where the first order specifies a pattern of sending the read requests before the write requests. The cache controller may further prioritize a second order of sending requests to the NVM-LLC in response to a determination that the write queue is full, the second order specifying a second pattern of alternating between sending a write request from the write queue and a read request from the read queue.

In a further embodiment, write-congestion-aware bypass (wCAB) is employed alone or in conjunction with the prioritization of read requests. With wCAB, write requests are intelligently dropped from the write queue, which is sometimes referred to as a "bypass" of certain write requests. When a write request is dropped from the write queue, the write request is not buffered to the LLC, causing a possible miss for a future read request to the NVM-LLC. The write request that is dropped may be chosen as statistically unlikely to be accessed, by determining a liveness score for the write request. A liveness score, for example, is the probability that a cache line (of the write request) will be recalled, e.g., accessed again. The cache controller may buffer a liveness score with each write request stored in the write queue. Upon detecting write congestion, e.g., when the write queue is full and the read queue has over a threshold number of read requests, the cache controller may drop the write requests having the lowest liveness score from the write queue, thereby bypassing that write request. In one embodiment, the threshold number depends on NVM-LLC write latency, turn-around time of fetching a cache line from main memory, and possibly other system configuration or parameter. The threshold number may further be updated experimentally based on a number that produces enhanced performance.

Note that the liveness score is different than known dead block predictors that bypass "dead" cache lines, which solely work to improve hit rates in the LLC. A dead line is a cache line that will not be used again anytime soon. A dead block predictor may learn a liveness score or reuse distance of a cache line based on usage history or based on the behavior of cache lines originating from the same program counter (PC). The present architecture, however, works to decrease NVM-LLC write congestion as a focus, while attempting to minimize the impact on LLC hit rate in the process. By opportunistically being more aggressive with bypassing write requests, even at the expense of some loss in hit rate, write congestion may be substantially reduced with a corresponding significant increase in performance of NVM-LLC devices.

FIG. 1 is a block diagram of an integrated circuit 100 with NVM-LLC, according to an embodiment of the present disclosure. The integrated circuit 100 may be a processor or a system on a chip in various embodiments. The integrated circuit 100 may include, for example, one or more cores 102a, 102b . . . 102n. The cores may include a corresponding microprocessor 106a, 106b, or 106n, level one instruction (L1D) cache, level one data cache (L1D), and level two (L2) cache. The integrated circuit 100 may further include one or more cache controllers 112a, 112b . . . 112m (or generally a cache controller 112), and corresponding LLC slices 114a, 114b, and 114m (together LLC 114). Each LLC slice may include one or more banks of non-volatile memory (NVM). The integrated circuit 100 may further include a ring interconnect 110 or other bus through which the various components of the integrated circuit 110 connect. In one embodiment, the integrated circuit 100 further includes a graphics controller 120 and a system agent 124. The system agent 124 may, through the ring interconnect 110, act on behalf of various input-output devices (IOs) 126 and a memory controller 130, which manages memory transactions to and from a main memory 134.

The integrated circuit 100 may be any type of processor, including a general purpose microprocessor, such as a processor in the Intel® Pentium® Processor Family, Intel® Xeon® Processor Family, Intel® Core™ Processor Family, or other processor family from Intel® Corporation, or another processor from another company, or a special purpose processor or microcontroller. The integrated circuit 100 may include multiple threads and multiple execution cores, in any combination. In one embodiment, the integrated circuit 100 is integrated in a single integrated circuit die having multiple hardware functional units (hereafter referred to as a multi-core system). The multi-core system may be a multi-core processor package, but may include other types of functional units than just processor cores. Functional hardware units may be processor cores, digital signal processors (DSP), image signal processors (ISP), graphics cores (also referred to as graphics units), voltage regulator (VR) phases, input/output (I/O) interfaces (e.g., serial links, DDR memory channels) and their controllers, network controllers, fabric controllers, or any combination thereof.

The IOs 126 may be any IO device, including a driver belonging to an I/O device, or software program capable of accessing (e.g., reading from, writing to) the main memory 134. When an IO device of the IOs 126 is a driver, the driver may be running on the cores 102a, 102b . . . 102n even though the driver belongs to an I/O device. An example of an IO device may include a graphics device or graphics driver. The IO device may receive or be assigned a memory address, multiple memory addresses, a block of memory address, or multiple blocks of memory addresses (hereafter referred to collectively as "an address"). For example, an operating system executed by the cores may assign the IO device an address to use during operation. Alternatively, the IO device may arbitrarily select an address from a list of available memory addresses. The IO device may also be integrated with the integrated circuit 100 as part of a system-on-a-chip (SoC).

The LLC 114 may include any type of persistent or non-volatile media, such as a flash memory device, a solid-state device (SSD), a memristor, phase change memory (e.g., PCS, PCM, PCME, PCRAM, Ovonic Unified Memory, Chalcogenide RAM, C-RAM, etc.), Spin Hall Effect (SHE) MRAM or Spin Transfer Torque Magnetic RAM (STTRAM), or other NVM memory device. The main memory 134 may also include one of such NVM technologies as discussed with reference to the LLC 114. The main memory 134 stores instructions and/or data represented by data signals that are to be interpreted and/or executed by the cores 102a, 102b . . . 102n. The cores may be coupled towards the memory 134 via the ring interconnect 110. In some embodiments, the main memory 134 is a dual-inline memory module (DIMM). The main memory 134 may also include volatile memory, such as in the form of random access memory (RAM) or registers.

The cache of the integrated circuit 100 is shown as having multi-level cache architecture, including an on-die or on-package L1 and L2 cache and off-chip NVM LLC 114. In another embodiment, the midlevel cache L2 may include additional levels of cache, such as L3, L4, and the like. The LLC 114 may also be on-die or on-chip, and be shared amongst the cores 106a, 106b, . . . 106n, where requests from the cores are routed through the ring interconnect 110 based on request address. Any number of cache configurations and cache sizes are contemplated. Depending on the architecture, the cache may be a single internal cache located on an integrated circuit or may be multiple levels of internal caches on the integrated circuit. For configurations with multiple cache levels, the caches can be configured to be inclusive or exclusive. Other embodiments include a combination of both internal and external caches depending on particular embodiments.

Accordingly, LLC architecture can be exclusive or inclusive of the core caches. An inclusive LLC may duplicate every line in the inner-level core caches within the LLC. This helps simplify coherence flows, although duplication comes at an overall reduced capacity. Inclusive LLCs have been the typical choice of most state-of-the-art commercial CPUs. Exclusive LLC architecture is implemented without the duplication of the inner-level core caches, and thus write traffic in exclusive LLCs can be substantially higher. As the L2 (or other intermediate cache) size continues to grow, LLCs are being increasingly designed as exclusive, primarily because of the capacity benefits of not replicating cache lines between the L2 cache and the LLC. As a result of the higher write volume, designing an STTRAM-based exclusive LLC is more challenging, though exclusion brings in higher effective cache capacity. This disclosure describes the present NVM-LLC architecture in the context of exclusive STTRAM LLC, as the write latency problem is more severe with these caches. One of ordinary skill, however, will see the applicability of the present design to many types of NVM-LLC architectures, and is not to be limited by reference to STTRAM LLC or to SHE LLC.

Figure 2:
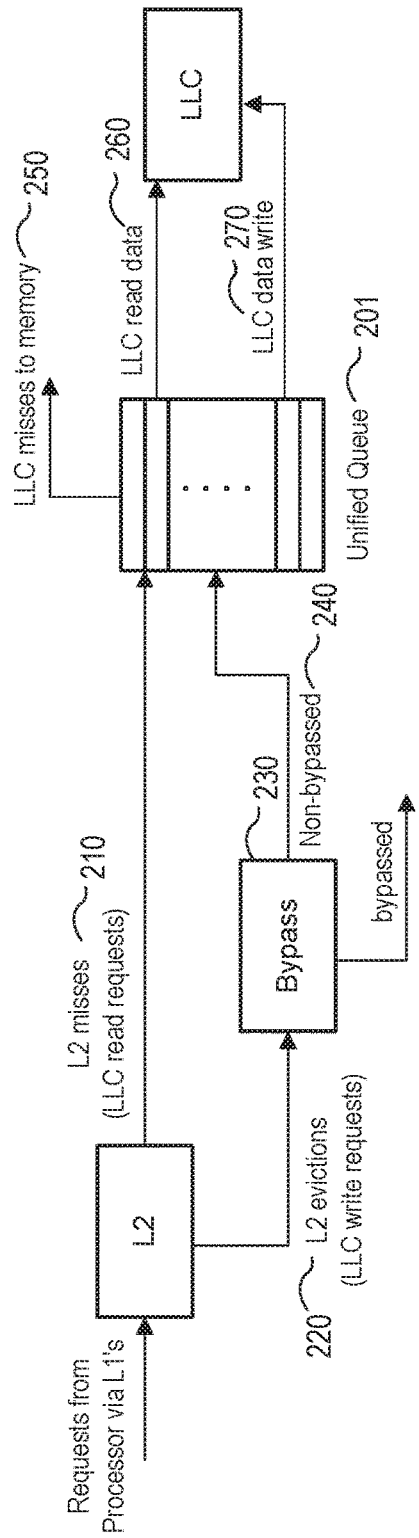
FIG. 2 is a block diagram of a unified queue for both read requests and write requests, according to an embodiment of the present disclosure.

In one embodiment, the disclosed architectural techniques reduce the interference of high latency write requests and thereby improve performance of NVM-LLC without compromising on density. Furthermore, many programs exhibit a low activity and high activity periods of operation. Various mechanisms are disclosed that time-shift write requests and complete the write requests opportunistically in periods of low read activity FIG. 2 is a block diagram of a unified queue 201 for both read requests and write requests, according to an embodiment of the present disclosure. The unified queue 201 may be located within a cache controller 112, or within one of the LLC slices 114a, 114b, or 114m. In one embodiment, the unified queue 201 is implemented as a baseline SRAM-LLC queue, in which a cache controller schedules memory requests (read requests or write requests) in the order of their arrival because SRAM is symmetric and has low latency for both read requests and write requests. In another embodiment, the unified queue 201 is implemented for an asymmetric STTRAM-LLC. For the STTRAM-LLC, the cache controller 112 may delay long latency write requests and service read requests with higher priority during periods of high activity. In subsequent low-activity periods, these accumulated write requests can be opportunistically serviced, referred to as performing lazy write-backs, which is discussed in more detail with respect to FIG. 4.

More specifically, with reference to FIG. 2 and assuming an exclusive LLC, a core 102a, 102b . . . or 102n may send a memory request (read request or write request), via the L1 caches, to the L2 cache (or other intermediate level cache positioned before the LLC). In one case, the memory controller 112 may intercept a read request from an L1 cache. If the read request hits the L2 cache, the L2 cache returns the data in the cache line that matches a tag lookup. If the read request misses the L2 cache, then the read request is forwarded to the LLC (210). In another case, the cache controller 112 may intercept a write request from an L1 cache. If the write request hits the L2 cache after a tag lookup, then the cache controller 112 may perform an in-place write of the data in the cache line. If there is a miss, the cache controller 112 may create a read request to the LLC to bring in the data to the L2 cache that is missing (210). Both read request and write request misses may bring new cache lines into the L2 cache; accordingly, to make space for the new cache lines, the L2 cache may evict some existing cache line (220).

The L2 evictions may be LLC write requests in the case of an exclusive LLC. In one embodiment, the cache controller 112 may perform a bypass of some of these LLC write requests generated by L2 evictions (230). This bypass may be performed by a dead block predictor of the cache controller 112 that drops "dead" LLC write requests, which solely works to improve hit rates in the LLC as discussed previously. Those write requests that are not bypassed are sent to the unified queue to be buffered for search within the LLC (240). Any memory requests that miss the LLC may be sent to the main memory 134 (250). The unified queue 201, in the STTRAM-LLC scenario, may then prioritize handling of read requests (260), and put off write requests for as long as possible (270).

Figure 3:
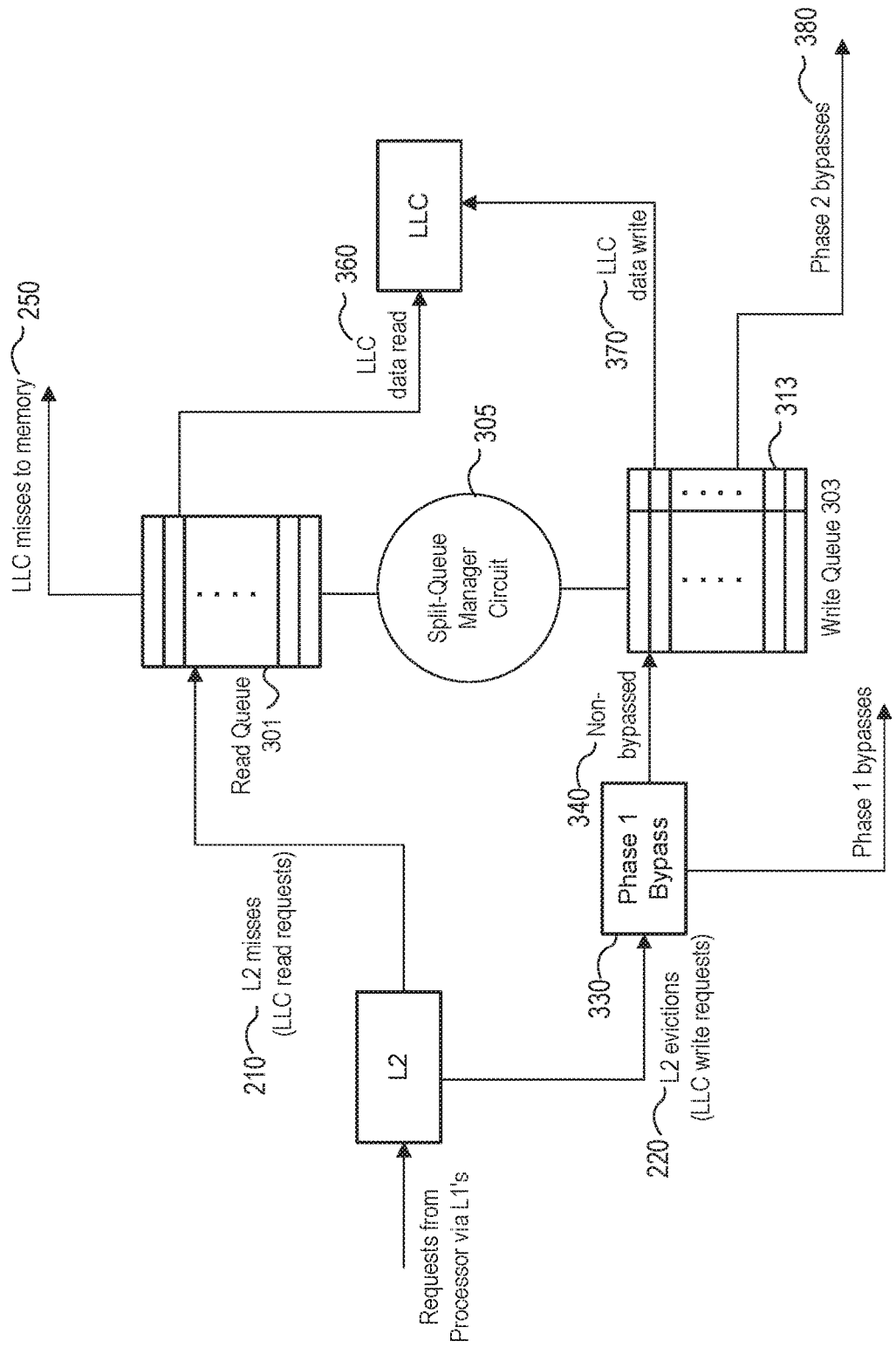
FIG. 3 is a block diagram of a split LLC request queue that separately buffers read requests and write requests, according to an embodiment of the present disclosure.

FIG. 3 is a block diagram of a split LLC request queue that separately buffers read requests and write requests, according to an embodiment of the present disclosure. To accomplish lazy write-backs, the LLC architecture splits the request queue of the LLC into a separate read queue 301 and write queue 303. As read requests and write requests arrive in the LLC, they are inserted into their respective queues.

The cache controller 112 is designed to prioritize sending read requests from the read queue 301 to the LLC over sending write requests from the write queue 303 to the LLC. This may be referred to herein as a first order. In one embodiment, the read queue 301 and the write queue 303 are located within the cache controller 112, or within one or more of the LLC slices 114a, 114b, or 114m.

When the write queue is full, the cache controller 112 may change the priority to a second order and alternate between sending a read request from the read queue 301, followed by sending a write request from the write queue 303, followed by sending a read request from the read queue, and so forth, in an alternating fashion. The advantage of this scheme is that for workload execution regions that exhibit alternating periods of low read activity and high read activity, the write queue 303 may buffer write requests during the short burst of high read activity. During a subsequent period of low read activity, the write queue 303 may be drained of write requests without causing any interference to the read requests buffered in the read queue 301.

Note that this policy differs from that of DRAM controllers that may use a write pending queue to reduce data bus contention between read operations and write operations, which is performed in bursts of read requests and write requests. In contrast, the proposed lazy write-back scheme sends a single write request followed by a single read request when the write queue is full. This helps minimize the queuing delay of read requests, because long latency write requests not only delay read requests, they also delay subsequent write requests and hence sending a burst of write requests would degrade STTRAM-LLC efficiency. In periods of low activity, the write requests are drained as fast as possible. In one embodiment of the disclosed integrated circuit 100, the architecture employs a 16-entry read queue and a 16-entry write queue at the LLC, although other sized queues are envisioned.

More specifically, with further reference to FIG. 3, recall that LLC read requests may be sent from the L2 cache to the LLC (210) and that LLC write requests (from L2 evictions) may be sent from the L2 cache toward the LLC (220). In one embodiment, the LLC read requests may now be buffered in the read queue 301. Furthermore, similar to the bypass discussed with reference to FIG. 2, the cache controller 112 may perform a similar initial bypass of some of the LLC write requests generated from L2 evictions, e.g., a "Phase 1" bypass (330). Those write requests that are not bypassed at this Phase 1 bypass may be sent to be buffered in the write queue 403, waiting to be sent to the LLC (340).

Under the present architecture, the cache controller 112 may further include a split-queue manager circuit 305 (or other logic) to perform prioritization between the read requests buffered in the read queue 301 and the write requests buffered in the write queue 303. Under conditions where the write queue 303 is not yet full, e.g., contains at least one remaining slot for buffering another write request, the split-queue manager circuit 305 may prioritize a first order of sending requests to the LLC, e.g., the NVM-LLC. The first order may specify a first pattern of sending the read requests before the write requests. Under the condition that the write queue 303 is full, the split-queue manager circuit 305 may prioritize a second order of sending memory requests to the NVM-LLC. The second order may specify a second pattern of alternating, every other one, between sending a write request from the write queue and a read request from the read queue (360, 370).

In a further embodiment, the split-queue manager circuit 305 of the cache controller 212 may additionally, or alternatively, perform a "Phase 2" bypass of a write request when detecting write congestion (380). Write congestion may be detected as the write queue 303 being full and the read queue having buffered over a threshold number of read requests. The split-queue manager circuit 305 may select a write request to bypass as the write request with the lowest liveness score upon detecting write congestion. For example, a liveness score may be a probability that a cache line of the write request will be recalled. The cache controller may buffer a liveness score with each write request stored in the write queue, e.g., in a liveness score field 313 of the write queue 303. When the split-queue manager circuit 305 detects write congestion, it may compare the liveness score of the liveness score field 313 of each buffered write request. The write request with the lowest liveness score may be dropped from the write queue 302, and therefore be bypassed (380).

Figure 4:
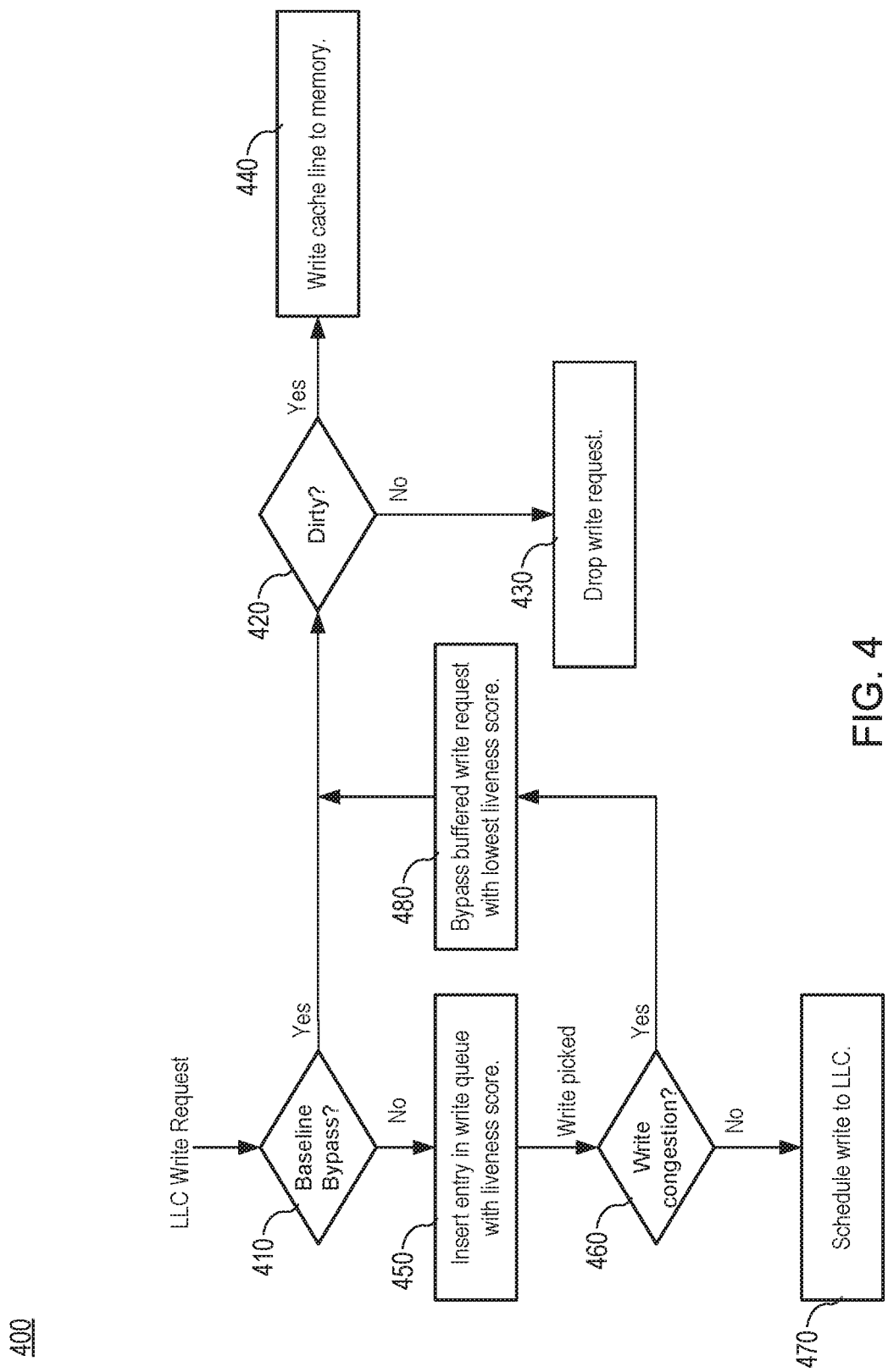
FIG. 4 is flow chart of a method for split queue and write-congestion-aware bypass (wCAB) caching in LLC, according to an embodiment of the present disclosure.

FIG. 4 is flow chart of a method 400 for split queue and write-congestion-aware bypass (wCAB) caching in LLC, according to an embodiment of the present disclosure. The method 400 may be performed by a process system that may include hardware (e.g., circuitry, dedicated logic, and/or programmable logic), software (e.g., instructions executable on a computer system to perform hardware simulation), or a combination thereof. In an illustrative example, the method 400 may be performed by the integrated circuit 100 of FIG. 1. More particularly, a cache controller 112 of the integrated circuit 100 may perform the method 400. The method 400 and/or each of its functions, routines, subroutines, or operations may be performed by one or more processors of a computing system such as a computing system that shares aspects of the system architecture. Two or more functions, routines, subroutines, or operations of the method 400 may be performed in parallel or in an order which may differ from the order described above.

Referring to FIG. 4, the method 400 may start with the cache controller receiving a write request destined to the LLC, and determining whether to perform a baseline bypass on the write request (410). The cache controller may perform the baseline bypass by assigning a liveness score to each L2-evicted cache line, e.g., using a dead block predictor as discussed previously. If the liveness score is already below a certain threshold, the write request is dropped, and thus is not buffered in the write queue. This initial threshold for liveness scores may be chosen as the best performing threshold when used in the context of an SRAM-LLC. Before being dropped, however, the method 400 may continue with the cache controller determining whether the cache line is dirty (420). If the cache line is not dirty, the method 400 may continue with the cache controller dropping the write request (430). If the cache line is dirty, the method 400 may continue with the cache controller writing the cache line to main memory (440).

With further reference to FIG. 4, if the liveness score for the cache line of the write request is above the initial threshold, then the method 400 may continue with the cache controller inserting an entry for the write request in the write queue with the liveness score (450). The method 400 may continue with the cache controller determining whether there is write congestion in scheduled memory operations to the LLC (460). Recall that write congestion may be considered as the write queue being full and the read queue having over a threshold number of read requests. If the answer is no, the method 400 may continue with the cache controller scheduling the write request to the LLC (470). If the answer is yes, the method 400 may continue with selecting the buffered cache line with the lowest liveness score to bypass (480), and the method may loop back to block 420.

Figure 5:
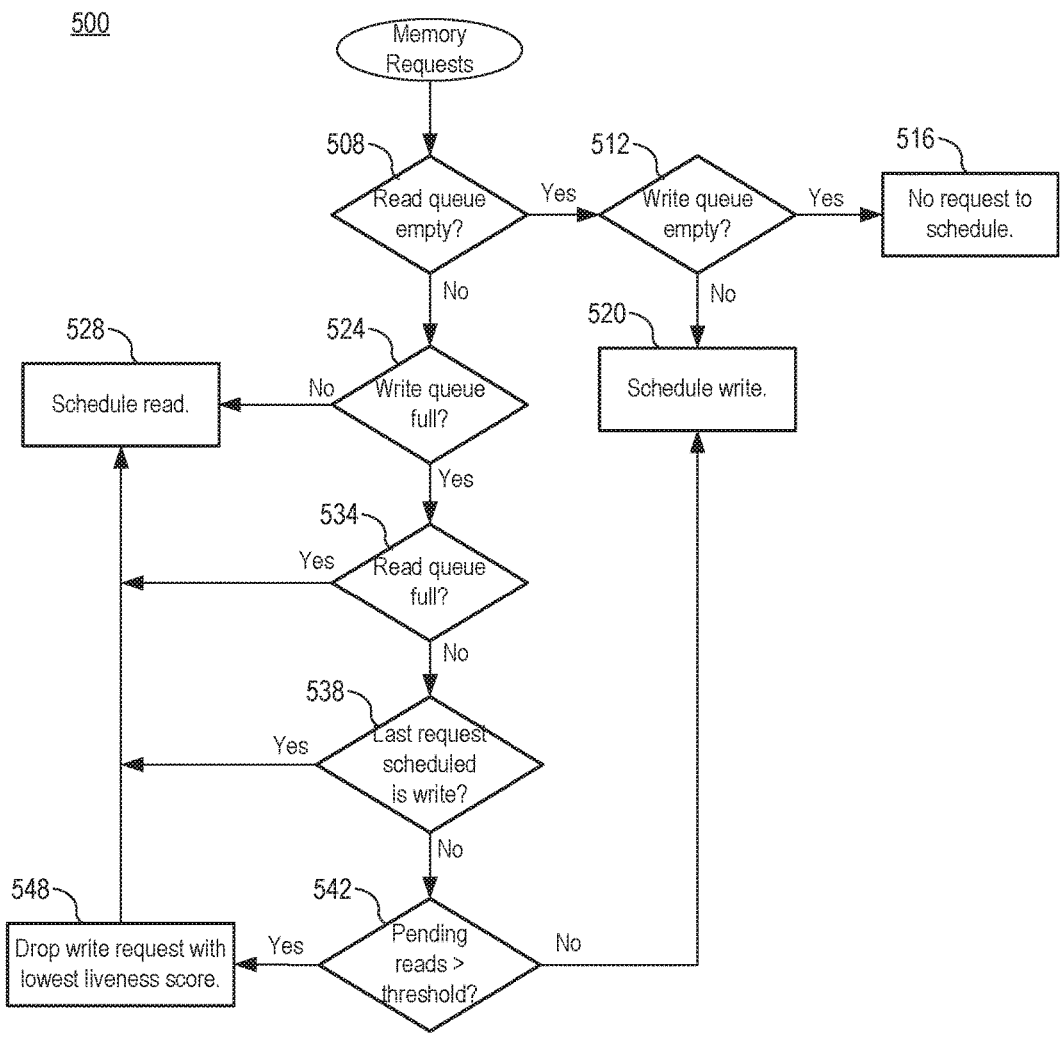
FIG. 5 is a flow chart of a method for performing read queue priority and selective write queue bypass, according to an embodiment of the present disclosure.

FIG. 5 is a flow chart of a method 500 for performing read queue priority and selective write queue bypass, according to an embodiment of the present disclosure. The method 500 may be performed by a process system that may include hardware (e.g., circuitry, dedicated logic, and/or programmable logic), software (e.g., instructions executable on a computer system to perform hardware simulation), or a combination thereof. In an illustrative example, the method 500 may be performed by the integrated circuit 100 of FIG. 1. More particularly, a cache controller 112 of the integrated circuit 100 may perform the method 500. The method 500 and/or each of its functions, routines, subroutines, or operations may be performed by one or more processors of a computing system such as a computing system that shares aspects of the system architecture. Two or more functions, routines, subroutines, or operations of the method 500 may be performed in parallel or in an order which may differ from the order described above.

Referring to FIG. 5, the method 500 may start with the cache controller determining whether the read queue is empty (508). If the read queue is empty, the method 500 may continue with the cache controller determining whether the write queue is empty (512). If both the read queue and the write queue are empty, there is no memory request to schedule (516). If, however, the write queue is not empty at block 512, the method 500 may continue with the cache controller scheduling a write request from the write queue to be sent to the LLC (520). Back at block 508, if the read queue is not empty, the method 500 may continue with the cache controller determining whether the write queue is full (524). If the write queue is not full, the method 500 may continue with the cache controller 528 scheduling a read request (528). In this way, the present architecture prioritizes scheduling and sending read requests before any write request as long as the write queue is not full.

With further reference to FIG. 5, back at block 524, if the write queue is full, the method 500 may continue with the cache controller determining whether the read queue is also full (534). If the answer is yes, the method 500 may continue with the cache controller scheduling the next read request to be sent to the LLC (528). If the answer is no, then the method 500 may continue with the cache controller determining whether the last request (e.g., most-recent request) scheduled was a write request (538). If the answer is yes, then the method 500 continues with the cache controller still scheduling a next read request in the read queue to be sent to the LLC (528). If, however, the answer is no, the method 500 may continue with the cache controller determining whether the number of read requests pending in the read queue is over a threshold number of read requests (542). If the answer at block 542 is yes, the method 500 may continue with the cache controller dropping the write request with the lowest liveness score (548). If the answer, however, is no, the method 500 may continue with scheduling a write request (520).

In this way, the disclosed split-queue and wCAB architecture prioritizes reads whenever possible, and may drop write requests when the write queue is full and the number of buffered read requests is over a certain threshold number. This scheme may significantly reduce latencies of write requests, and perform write requests only when absolutely necessary, depending how big of a write queue is designed (thus impacting how quickly the write queue may fill up). The savings in reducing write latencies is a worthwhile tradeoff for slightly higher miss rates, approximating SRAM-LLC performance with the increased capacity of NVM.

FIG. 6A is a block diagram illustrating a micro-architecture for a processor 600 to perform operations of a processor or an integrated circuit for performing caching in the processor or integrated circuit, according to an embodiment. Specifically, processor 600 depicts an in-order architecture core and a register renaming logic, out-of-order issue/execution logic to be included in a processor according to at least one embodiment of the disclosure.

Processor 600 includes a front end unit 630 coupled to an execution engine unit 650, and both are coupled to a memory unit 670. The processor 600 may include a reduced instruction set computing (RISC) core, a complex instruction set computing (CISC) core, a very long instruction word (VLIW) core, or a hybrid or alternative core type. As yet another option, processor 600 may include a special-purpose core, such as, for example, a network or communication core, compression engine, graphics core, or the like. In one embodiment, processor 600 may be a multi-core processor or may be part of a multi-processor system.

The front end unit 630 includes a branch prediction unit 632 coupled to an instruction cache unit 634, which is coupled to an instruction translation lookaside buffer (TLB) 636, which is coupled to an instruction fetch unit 638, which is coupled to a decode unit 640. The decode unit 640 (also known as a decoder) may decode instructions, and generate as an output one or more micro-operations, micro-code entry points, microinstructions, other instructions, or other control signals, which are decoded from, or which otherwise reflect, or are derived from, the original instructions. The decoder 640 may be implemented using various different mechanisms. Examples of suitable mechanisms include, but are not limited to, look-up tables, hardware implementations, programmable logic arrays (PLAs), microcode read only memories (ROMs), etc. The instruction cache unit 634 is further coupled to the memory unit 670. The decode unit 640 is coupled to a rename/allocator unit 652 in the execution engine unit 650.

The execution engine unit 650 includes the rename/allocator unit 652 coupled to a retirement unit 654 and a set of one or more scheduler unit(s) 656. The scheduler unit(s) 656 represents any number of different scheduler circuits, including reservations stations (RS), central instruction window, etc. The scheduler unit(s) 656 is coupled to the physical register set(s) unit(s) 658. Each of the physical register set(s) units 658 represents one or more physical register sets, different ones of which store one or more different data types, such as scalar integer, scalar floating point, packed integer, packed floating point, vector integer, vector floating point, etc., status (e.g., an instruction pointer that is the address of the next instruction to be executed), etc. The physical register set(s) unit(s) 658 is overlapped by the retirement unit 654 to illustrate various ways in which register renaming and out-of-order execution may be implemented (e.g., using a reorder buffer(s) and a retirement register set(s), using a future file(s), a history buffer(s), and a retirement register set(s); using a register maps and a pool of registers; etc.).

Generally, the architectural registers are visible from the outside of the processor or from a programmer's perspective. The registers are not limited to any known particular type of circuit. Various different types of registers are suitable as long as they are capable of storing and providing data as described herein. Examples of suitable registers include, but are not limited to, dedicated physical registers, dynamically allocated physical registers using register renaming, combinations of dedicated and dynamically allocated physical registers, etc. The retirement unit 654 and the physical register set(s) unit(s) 658 are coupled to the execution cluster(s) 660. The execution cluster(s) 660 includes a set of one or more execution units 662 and a set of one or more memory access units 664. The execution units 662 may perform various operations (e.g., shifts, addition, subtraction, multiplication) and operate on various types of data (e.g., scalar floating point, packed integer, packed floating point, vector integer, vector floating point).

While some embodiments may include a number of execution units dedicated to specific functions or sets of functions, other embodiments may include only one execution unit or multiple execution units that all perform all functions. The scheduler unit(s) 656, physical register set(s) unit(s) 658, and execution cluster(s) 660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register set(s) unit, and/or execution cluster—and in the case of a separate memory access pipeline, certain embodiments are implemented in which only the execution cluster of this pipeline has the memory access unit(s) 664). It should also be understood that where separate pipelines are used, one or more of these pipelines may be out-of-order issue/execution and the rest in-order.

The set of memory access units 664 is coupled to the memory unit 670, which may include a data prefetcher 680, a data TLB unit 672, a data cache unit (DCU) 674, and a level 2 (L2) cache unit 676, to name a few examples. In some embodiments DCU 674 is also known as a first level data cache (L1 cache). The DCU 674 may handle multiple outstanding cache misses and continue to service incoming stores and loads. It also supports maintaining cache coherency. The data TLB unit 672 is a cache used to improve virtual address translation speed by mapping virtual and physical address spaces. In one exemplary embodiment, the memory access units 664 may include a load unit, a store address unit, and a store data unit, each of which is coupled to the data TLB unit 672 in the memory unit 670. The L2 cache unit 676 may be coupled to one or more other levels of cache and eventually to a main memory.

In one embodiment, the data prefetcher 680 speculatively loads/prefetches data to the DCU 674 by automatically predicting which data a program is about to consume. Prefetching may refer to transferring data stored in one memory location (e.g., position) of a memory hierarchy (e.g., lower level caches or memory) to a higher-level memory location that is closer (e.g., yields lower access latency) to the processor before the data is actually demanded by the processor. More specifically, prefetching may refer to the early retrieval of data from one of the lower level caches/memory to a data cache and/or prefetch buffer before the processor issues a demand for the specific data being returned.

The processor 600 may support one or more instructions sets (e.g., the x86 instruction set (with some extensions that have been added with newer versions); the MIPS instruction set of Imagination Technologies of Kings Langley, Hertfordshire, UK; the ARM instruction set (with optional additional extensions such as NEON) of ARM Holdings of Sunnyvale, Calif.).

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes a separate instruction and data cache units and a shared L2 cache unit, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIG. 6B is a block diagram illustrating an in-order pipeline and a register renaming stage, out-of-order issue/execution pipeline implemented by processor 600 of FIG. 6A according to some embodiments of the disclosure. The solid lined boxes in FIG. 6B illustrate an in-order pipeline 601, while the dashed lined boxes illustrate a register renaming, out-of-order issue/execution pipeline 603. In FIG. 6B, the pipelines 601 and 603 include a fetch stage 602, a length decode stage 604, a decode stage 606, an allocation stage 608, a renaming stage 610, a scheduling (also known as a dispatch or issue) stage 612, a register read/memory read stage 614, an execute stage 616, a write back/memory write stage 618, an exception handling stage 622, and a commit stage 624. In some embodiments, the ordering of stages 602-624 may be different than illustrated and are not limited to the specific ordering shown in FIG. 6B.

Figure 7:
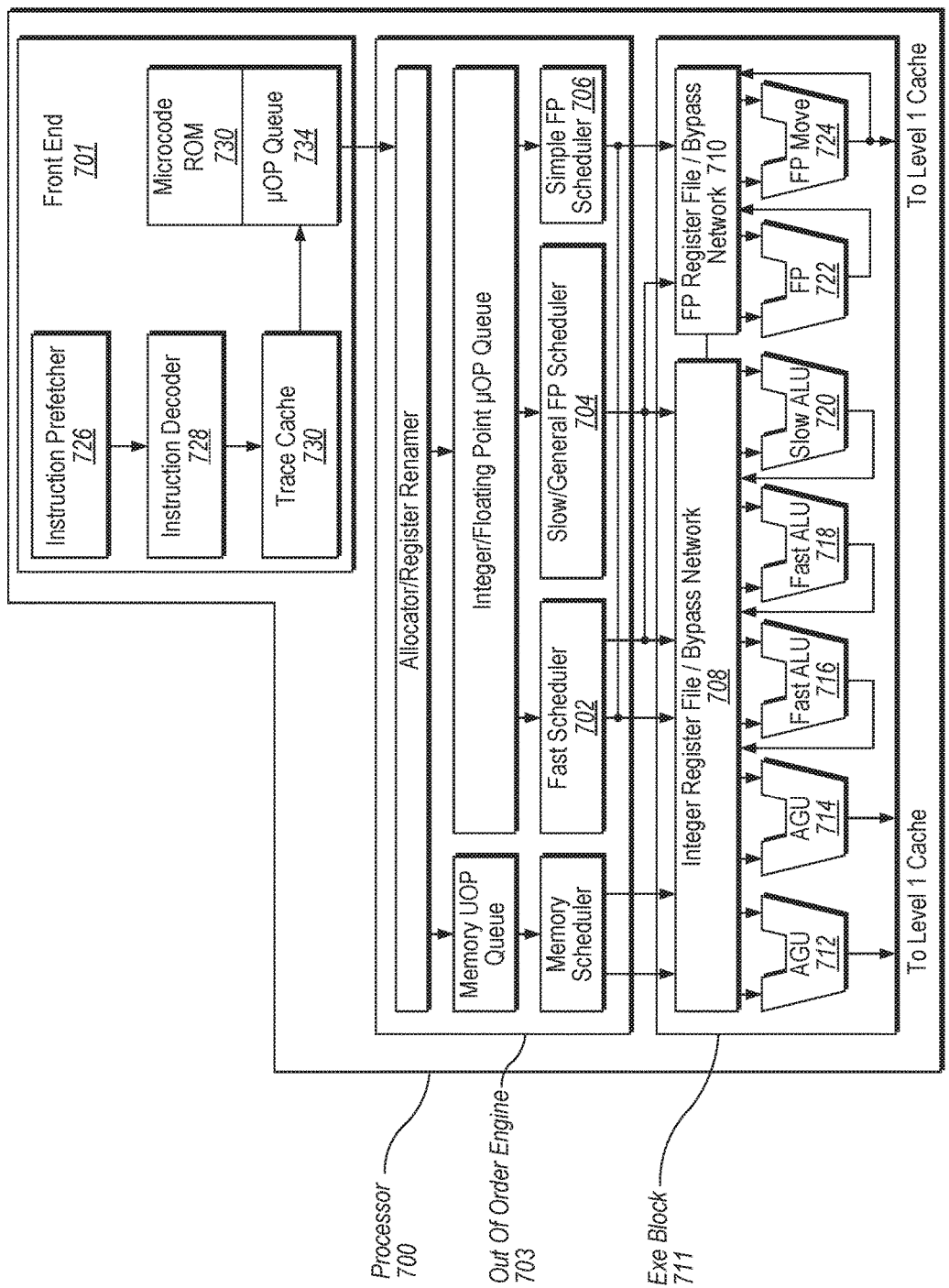
FIG. 7 illustrates a block diagram of the micro-architecture for a processor or an integrated circuit for performing caching in the processor or integrated circuit, according to an embodiment of the present disclosure.

FIG. 7 illustrates a block diagram of the micro-architecture for a processor 700 that includes logic circuits of a processor or an integrated circuit for performing L caching in the processor or integrated circuit, according to an embodiment of the present disclosure. In some embodiments, an instruction in accordance with one embodiment can be implemented to operate on data elements having sizes of byte, word, doubleword, quadword, etc., as well as datatypes, such as single and double precision integer and floating point datatypes. In one embodiment the in-order front end 701 is the part of the processor 700 that fetches instructions to be executed and prepares them to be used later in the processor pipeline. The embodiments of the page additions and content copying can be implemented in processor 700.

The front end 701 may include several units. In one embodiment, the instruction prefetcher 716 fetches instructions from memory and feeds them to an instruction decoder 718 which in turn decodes or interprets them. For example, in one embodiment, the decoder decodes a received instruction into one or more operations called "micro-instructions" or "micro-operations" (also called micro op or uops) that the machine can execute. In other embodiments, the decoder parses the instruction into an opcode and corresponding data and control fields that are used by the micro-architecture to perform operations in accordance with one embodiment. In one embodiment, the trace cache 730 takes decoded uops and assembles them into program ordered sequences or traces in the uop queue 734 for execution. When the trace cache 730 encounters a complex instruction, microcode ROM (or RAM) 732 provides the uops needed to complete the operation.

Some instructions are converted into a single micro-op, whereas others need several micro-ops to complete the full operation. In one embodiment, if more than four micro-ops are needed to complete an instruction, the decoder 718 accesses the microcode ROM 732 to do the instruction. For one embodiment, an instruction can be decoded into a small number of micro ops for processing at the instruction decoder 718. In another embodiment, an instruction can be stored within the microcode ROM 732 should a number of micro-ops be needed to accomplish the operation. The trace cache 730 refers to an entry point programmable logic array (PLA) to determine a correct micro-instruction pointer for reading the micro-code sequences to complete one or more instructions in accordance with one embodiment from the micro-code ROM 732. After the microcode ROM 732 finishes sequencing micro-ops for an instruction, the front end 701 of the machine resumes fetching micro-ops from the trace cache 730.

The out-of-order execution engine 703 is where the instructions are prepared for execution. The out-of-order execution logic has a number of buffers to smooth out and re-order the flow of instructions to optimize performance as they go down the pipeline and get scheduled for execution. The allocator logic allocates the machine buffers and resources that each uop needs in order to execute. The register renaming logic renames logic registers onto entries in a register set. The allocator also allocates an entry for each uop in one of the two uop queues, one for memory operations and one for non-memory operations, in front of the instruction schedulers: memory scheduler, fast scheduler 702, slow/general floating point scheduler 704, and simple floating point scheduler 706. The uop schedulers 702, 704, 706, determine when a uop is ready to execute based on the readiness of their dependent input register operand sources and the availability of the execution resources the uops need to complete their operation. The fast scheduler 702 of one embodiment can schedule on each half of the main clock cycle while the other schedulers can only schedule once per main processor clock cycle. The schedulers arbitrate for the dispatch ports to schedule uops for execution.

Register sets 708, 710, sit between the schedulers 702, 704, 706, and the execution units 712, 714, 716, 718, 720, 722, 724 in the execution block 711. There is a separate register set 708, 710, for integer and floating point operations, respectively. Each register set 708, 710, of one embodiment also includes a bypass network that can bypass or forward just completed results that have not yet been written into the register set to new dependent uops. The integer register set 708 and the floating point register set 710 are also capable of communicating data with the other. For one embodiment, the integer register set 708 is split into two separate register sets, one register set for the low order 32 bits of data and a second register set for the high order 32 bits of data. The floating point register set 710 of one embodiment has 128 bit wide entries because floating point instructions typically have operands from 64 to 128 bits in width.

The execution block 711 contains the execution units 712, 714, 716, 718, 720, 722, 724, where the instructions are actually executed. This section includes the register sets 708, 710, that store the integer and floating point data operand values that the micro-instructions need to execute. The processor 700 of one embodiment is comprised of a number of execution units: address generation unit (AGU) 712, AGU 714, fast ALU 716, fast ALU 718, slow ALU 720, floating point ALU 712, floating point move unit 714. For one embodiment, the floating point execution blocks 712, 714, execute floating point, MMX, SIMD, and SSE, or other operations. The floating point ALU 712 of one embodiment includes a 64 bit by 64 bit floating point divider to execute divide, square root, and remainder micro-ops. For embodiments of the present disclosure, instructions involving a floating point value may be handled with the floating point hardware.

In one embodiment, the ALU operations go to the high-speed ALU execution units 716, 718. The fast ALUs 716, 718, of one embodiment can execute fast operations with an effective latency of half a clock cycle. For one embodiment, most complex integer operations go to the slow ALU 720 as the slow ALU 720 includes integer execution hardware for long latency type of operations, such as a multiplier, shifts, flag logic, and branch processing. Memory load/store operations are executed by the AGUs 722, 724. For one embodiment, the integer ALUs 716, 718, 720, are described in the context of performing integer operations on 64 bit data operands. In alternative embodiments, the ALUs 716, 718, 720, can be implemented to support a variety of data bits including 16, 32, 128, 256, etc. Similarly, the floating point units 722, 724, can be implemented to support a range of operands having bits of various widths. For one embodiment, the floating point units 722, 724, can operate on 128 bits wide packed data operands in conjunction with SIMD and multimedia instructions.

In one embodiment, the uops schedulers 702, 704, 706, dispatch dependent operations before the parent load has finished executing. As uops are speculatively scheduled and executed in processor 700, the processor 700 also includes logic to handle memory misses. If a data load misses in the data cache, there can be dependent operations in flight in the pipeline that have left the scheduler with temporarily incorrect data. A replay mechanism tracks and re-executes instructions that use incorrect data. Only the dependent operations need to be replayed and the independent ones are allowed to complete. The schedulers and replay mechanism of one embodiment of a processor are also designed to catch instruction sequences for text string comparison operations.

The term "registers" may refer to the on-board processor storage locations that are used as part of instructions to identify operands. In other words, registers may be those that are usable from the outside of the processor (from a programmer's perspective). However, the registers of an embodiment should not be limited in meaning to a particular type of circuit. Rather, a register of an embodiment is capable of storing and providing data, and performing the functions described herein. The registers described herein can be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit integer data. A register set of one embodiment also contains eight multimedia SIMD registers for packed data.

For the discussions herein, the registers are understood to be data registers designed to hold packed data, such as 64 bits wide MMX™ registers (also referred to as 'mm' registers in some instances) in microprocessors enabled with MMX technology from Intel Corporation of Santa Clara, Calif. These MMX registers, available in both integer and floating point forms, can operate with packed data elements that accompany SIMD and SSE instructions. Similarly, 128 bits wide XMM registers relating to SSE2, SSE3, SSE4, or beyond (referred to generically as "SSEx") technology can also be used to hold such packed data operands. In one embodiment, in storing packed data and integer data, the registers do not need to differentiate between the two data types. In one embodiment, integer and floating point are either contained in the same register set or different register sets. Furthermore, in one embodiment, floating point and integer data may be stored in different registers or the same registers.

Figure 8:
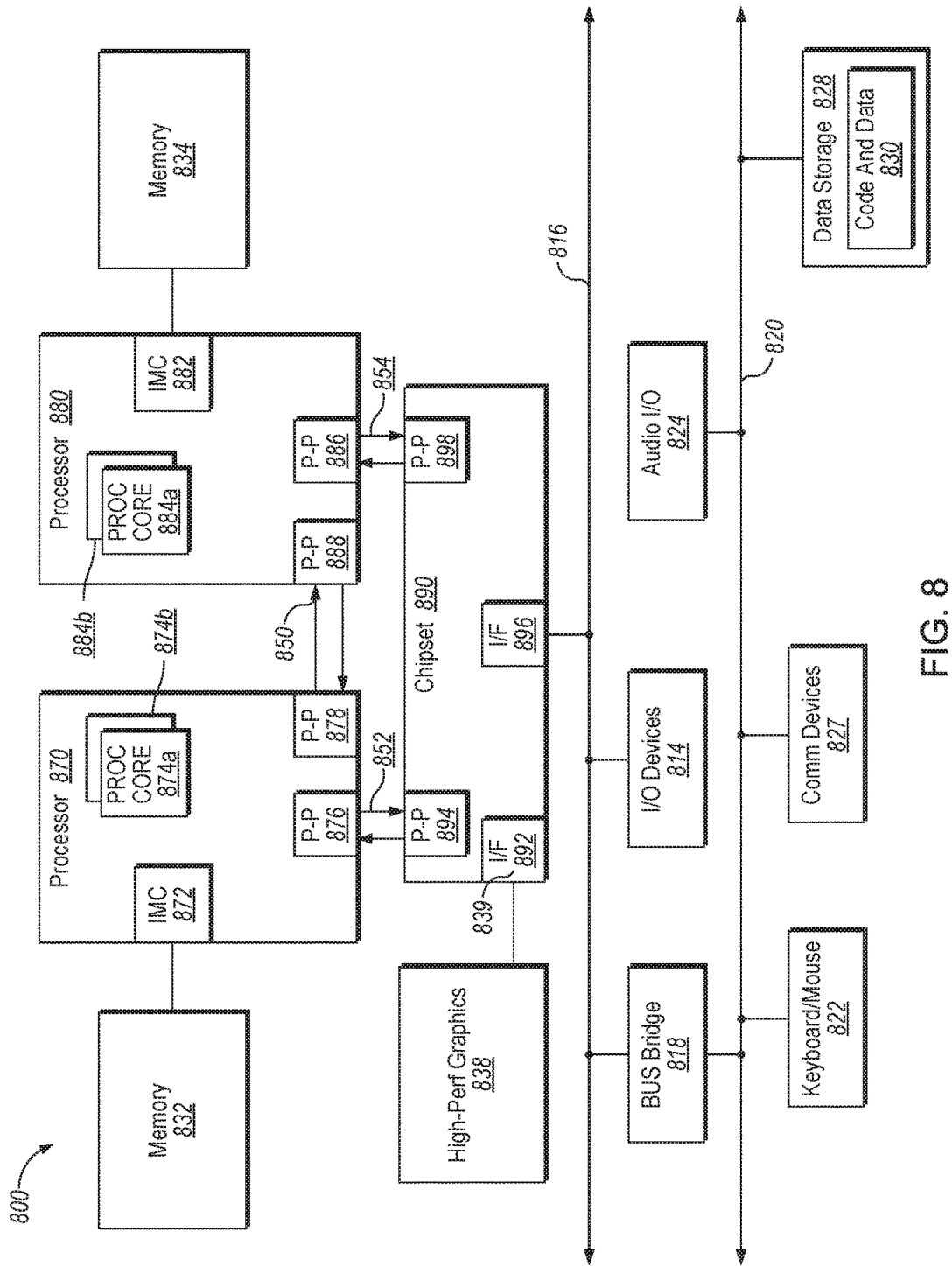
FIG. 8 is a block diagram of a computer system according to one implementation.

Embodiments may be implemented in many different system types. Referring now to FIG. 8, shown is a block diagram of a multiprocessor system 800 in accordance with an implementation. As shown in FIG. 8, multiprocessor system 800 is a point-to-point interconnect system, and includes a first processor 870 and a second processor 880 coupled via a point-to-point interconnect 850. As shown in FIG. 8, each of processors 870 and 880 may be multicore processors, including first and second processor cores (i.e., processor cores 874*a* and 874*b* and processor cores 884*a* and 884*b*), although potentially many more cores may be present in the processors. While shown with two processors 870, 880, it is to be understood that the scope of the present disclosure is not so limited. In other implementations, one or more additional processors may be present in a given processor.

Processors 870 and 880 are shown including integrated memory controller units 872 and 882, respectively. Processor 870 also includes as part of its bus controller units point-to-point (P-P) interfaces 876 and 888; similarly, second processor 880 includes P-P interfaces 886 and 888. Processors 870, 880 may exchange information via a point-to-point (P-P) interface 850 using P-P interface circuits 878, 888. As shown in FIG. 8, IMCs 872 and 882 couple the processors to respective memories, namely a memory 832 and a memory 834, which may be portions of main memory locally attached to the respective processors.

Processors 870, 880 may exchange information with a chipset 890 via individual P-P interfaces 852, 854 using point to point interface circuits 876, 894, 886, 898. Chipset 890 may also exchange information with a high-performance graphics circuit 838 via a high-performance graphics interface 839.

Chipset 890 may be coupled to a first bus 816 via an interface 896. In one embodiment, first bus 816 may be a Peripheral Component Interconnect (PCI) bus, or a bus such as a PCI Express bus or interconnect bus, although the scope of the present disclosure is not so limited.

Figure 9:
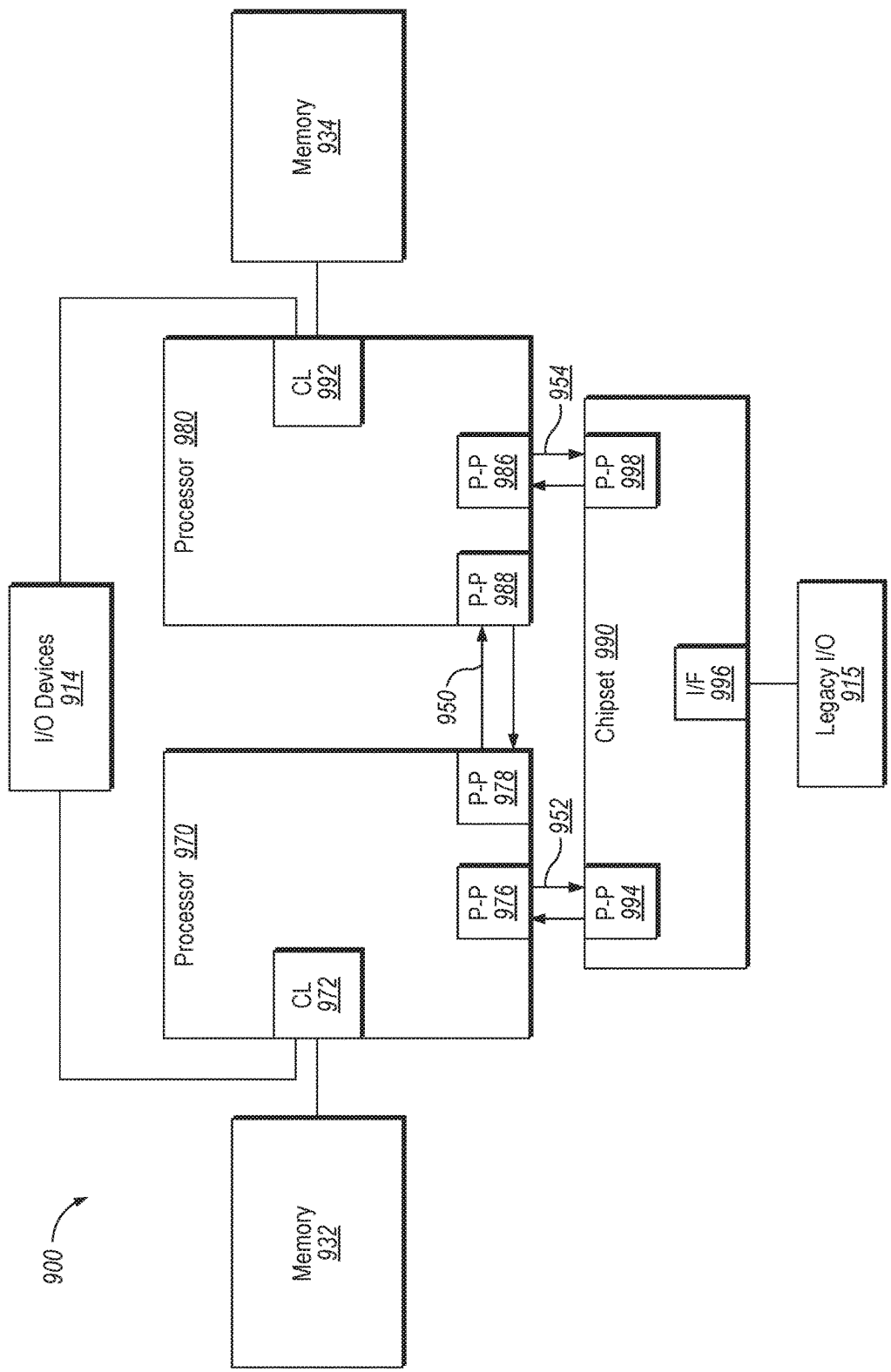
FIG. 9 is a block diagram of a computer system according to another implementation.

Referring now to FIG. 9, shown is a block diagram of a third system 900 in accordance with an embodiment of the present disclosure. Like elements in FIGS. 8 and 9 bear like reference numerals and certain aspects of FIG. 9 have been omitted from FIG. 8 in order to avoid obscuring other aspects of FIG. 9.

FIG. 9 illustrates that the processors 970, 980 may include integrated memory and I/O control logic ("CL") 972 and 992, respectively. For at least one embodiment, the CL 972, 982 may include integrated memory controller units such as described herein. In addition. CL 972, 992 may also include I/O control logic. FIG. 9 illustrates that the memories 932, 934 are coupled to the CL 972, 992, and that I/O devices 914 are also coupled to the control logic 972, 992. Legacy I/O devices 915 are coupled to the chipset 990.

Figure 10:
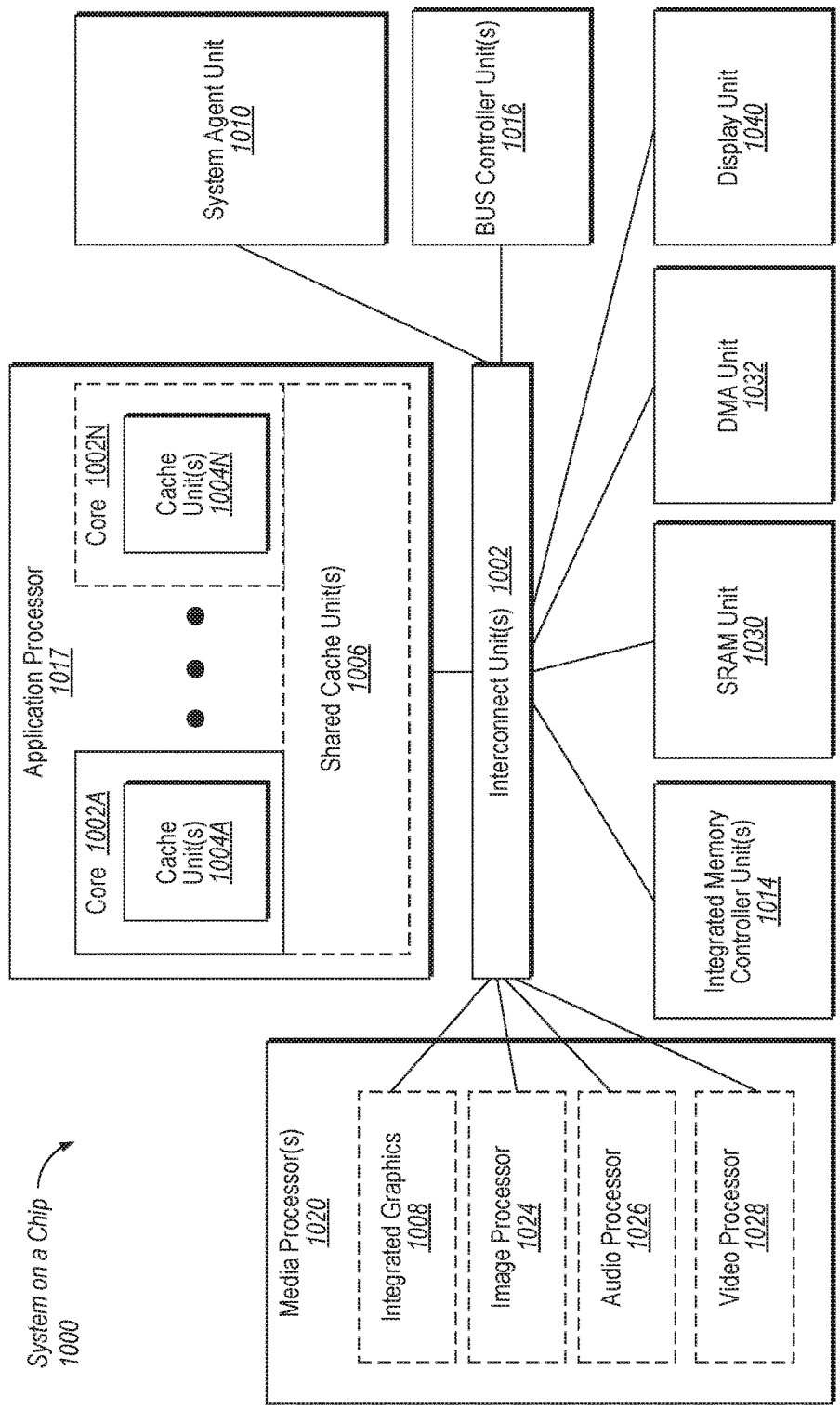
FIG. 10 is a block diagram of a system-on-a-chip according to one implementation.

FIG. 10 is an exemplary system on a chip (SoC) 1000 that may include one or more of the cores 1002A . . . 1002N. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Within the exemplary SoC 1000 of FIG. 10, dashed lined boxes are features on more advanced SoCs. An interconnect unit(s) 1002 may be coupled to: an application processor 1017 which includes a set of one or more cores 1002A-N and shared cache unit(s) 1006; a system agent unit 1010; a bus controller unit(s) 1016; an integrated memory controller unit(s) 1014; a set of one or more media processors 1020 which may include integrated graphics logic 1008, an image processor 1024 for providing still and/or video camera functionality, an audio processor 1026 for providing hardware audio acceleration, and a video processor 1028 for providing video encode/decode acceleration; a static random access memory (SRAM) unit 1030; a direct memory access (DMA) unit 1032; and a display unit 1040 for coupling to one or more external displays.

Figure 11:
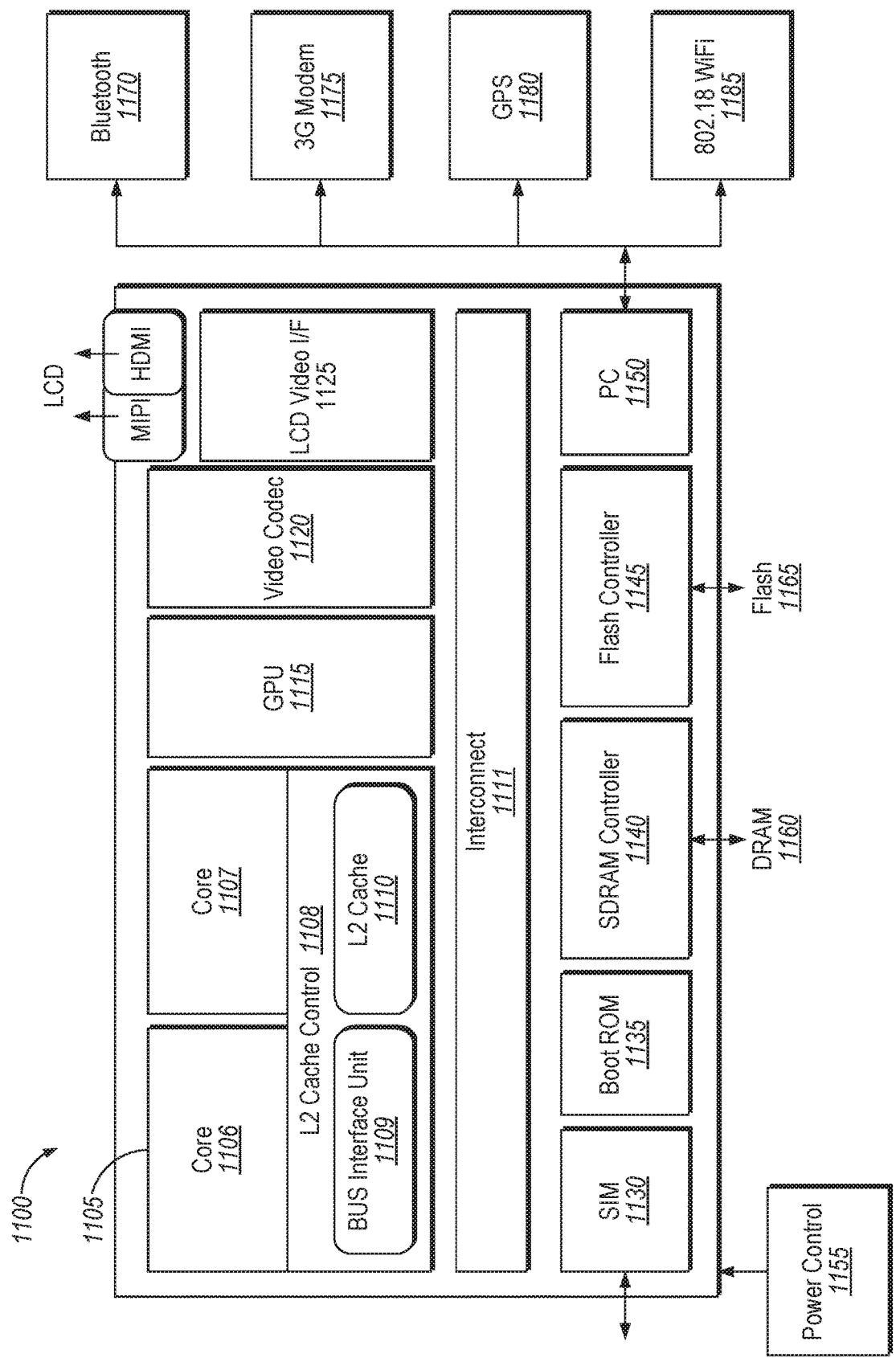
FIG. 11 illustrates another implementation of a block diagram for a computing system.

Turning next to FIG. 11, an embodiment of a system on-chip (SoC) design in accordance with embodiments of the disclosure is depicted. As an illustrative example, SoC 1100 is included in user equipment (UE). In one embodiment, UE refers to any device to be used by an end-user to communicate, such as a hand-held phone, smartphone, tablet, ultra-thin notebook, notebook with broadband adapter, or any other similar communication device. A UE may connect to a base station or node, which can correspond in nature to a mobile station (MS) in a GSM network. The embodiments of the page additions and content copying can be implemented in SoC 1100.

Here, SoC 1100 includes 2 cores—1106 and 1107. Similar to the discussion above, cores 1106 and 1107 may conform to an Instruction Set Architecture, such as a processor having the Intel® Architecture Core™, an Advanced Micro Devices, Inc. (AMD) processor, a MIPS-based processor, an ARM-based processor design, or a customer thereof, as well as their licensees or adopters. Cores 1106 and 1107 are coupled to cache control 1108 that is associated with bus interface unit 1109 and L2 cache 1110 to communicate with other parts of system 1100. Interconnect 1111 includes an on-chip interconnect, such as an IOSF, AMBA, or other interconnects discussed above, which can implement one or more aspects of the described disclosure.

In one embodiment, SDRAM controller 1140 may connect to interconnect 1111 via cache 1110. Interconnect 1111 provides communication channels to the other components, such as a Subscriber Identity Module (SIM) 1130 to interface with a SIM card, a boot ROM 1135 to hold boot code for execution by cores 1106 and 1107 to initialize and boot SoC 1100, a SDRAM controller 1140 to interface with external memory (e.g. DRAM 1160), a flash controller 1145 to interface with non-volatile memory (e.g. Flash 1165), a peripheral control 1150 (e.g. Serial Peripheral Interface) to interface with peripherals, video codecs 1120 and Video interface 1125 to display and receive input (e.g. touch enabled input), GPU 1115 to perform graphics related computations, etc. Any of these interfaces may incorporate aspects of the embodiments described herein.

In addition, the system illustrates peripherals for communication, such as a Bluetooth® module 1170, 3G modem 1175, GPS 1180, and Wi-Fi® 1185. Note as stated above, a UE includes a radio for communication. As a result, these peripheral communication modules may not all be included. However, in a UE some form of a radio for external communication should be included.

Figure 12:
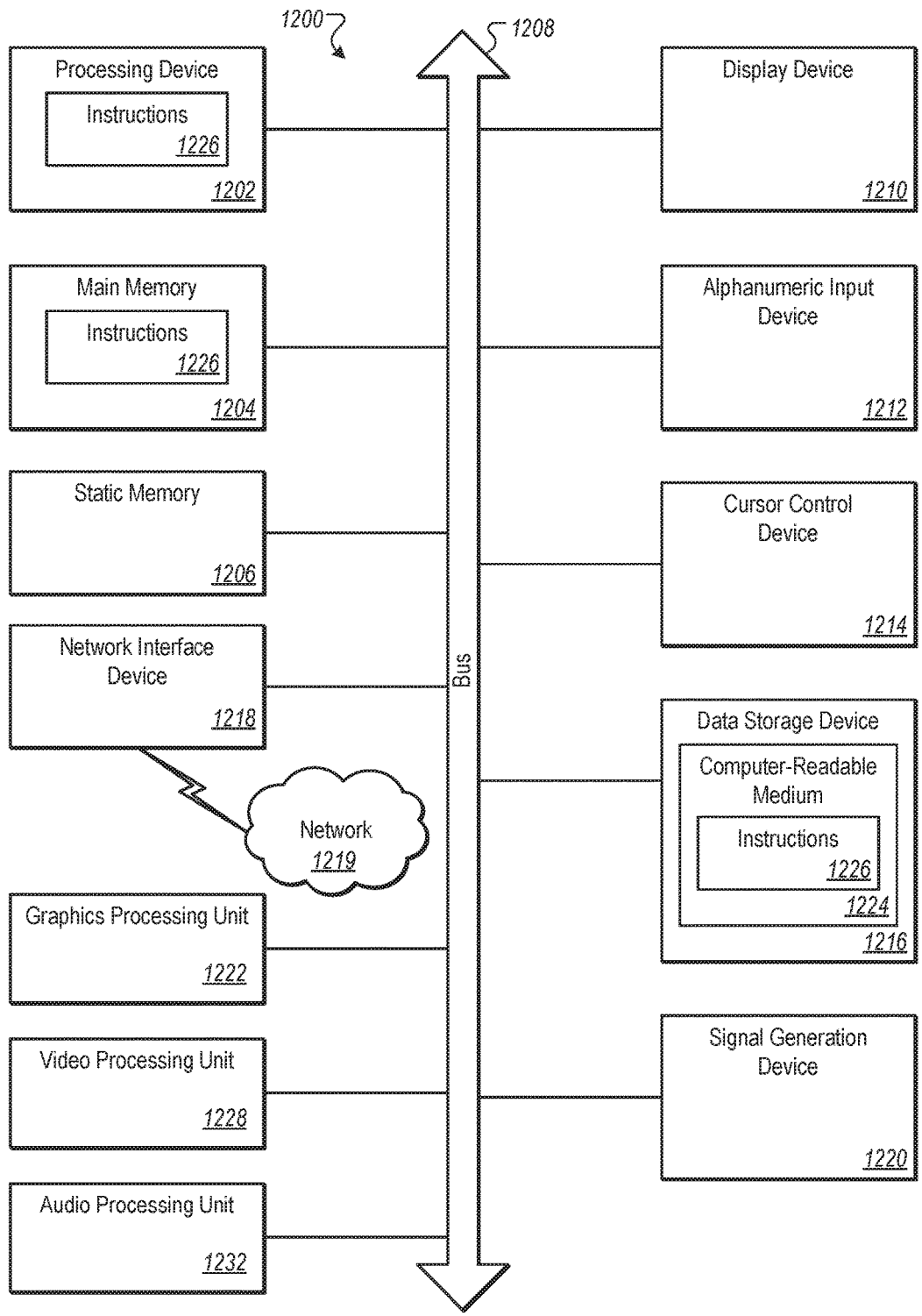
FIG. 12 illustrates another implementation of a block diagram for a computing system.

FIG. 12 illustrates a diagrammatic representation of a machine in the example form of a computing system 1200 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client device in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. The embodiments of the page additions and content copying can be implemented in computing system 1200.

The computing system 1200 includes a processing device 1202, main memory 1204 (e.g., flash memory, dynamic random access memory (DRAM) (such as synchronous DRAM (SDRAM) or DRAM (RDRAM), etc.), a static memory 1206 (e.g., flash memory, static random access memory (SRAM), etc.), and a data storage device 1216, which communicate with each other via a bus 1208.

Processing device 1202 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 1202 may also be one or more special-purpose processing devices such as an application-specific integrated circuit (ASIC), a field programmable gate array (FPGA), a digital signal processor (DSP), network processor, or the like. In one embodiment, processing device 1202 may include one or more processor cores. The processing device 1202 is configured to execute the processing logic 1226 for performing the operations discussed herein.

In one embodiment, processing device 1202 can be part of a processor or an integrated circuit that includes the disclosed LLC caching architecture. Alternatively, the computing system 1200 can include other components as described herein. It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

The computing system 1200 may further include a network interface device 1218 communicably coupled to a network 1219. The computing system 1200 also may include a video display device 1210 (e.g., a liquid crystal display (LCD) or a cathode ray tube (CRT)), an alphanumeric input device 1210 (e.g., a keyboard), a cursor control device 1214 (e.g., a mouse), a signal generation device 1220 (e.g., a speaker), or other peripheral devices. Furthermore, computing system 1200 may include a graphics processing unit 1222, a video processing unit 1228 and an audio processing unit 1232. In another embodiment, the computing system 1200 may include a chipset (not illustrated), which refers to a group of integrated circuits, or chips, that are designed to work with the processing device 1202 and controls communications between the processing device 1202 and external devices. For example, the chipset may be a set of chips on a motherboard that links the processing device 1202 to very high-speed devices, such as main memory 1204 and graphic controllers, as well as linking the processing device 1202 to lower-speed peripheral buses of peripherals, such as USB, PCI or ISA buses.

The data storage device 1216 may include a computer-readable storage medium 1224 on which is stored software 1226 embodying any one or more of the methodologies of functions described herein. The software 1226 may also reside, completely or at least partially, within the main memory 1204 as instructions 1226 and/or within the processing device 1202 as processing logic during execution thereof by the computing system 1200; the main memory 1204 and the processing device 1202 also constituting computer-readable storage media.

The computer-readable storage medium 1224 may also be used to store instructions 1226 utilizing the processing device 1202, and/or a software library containing methods that call the above applications. While the computer-readable storage medium 1224 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instruction for execution by the machine and that cause the machine to perform any one or more of the methodologies of the present embodiments. The term "computer-readable storage medium" shall accordingly be taken to include, but not be limited to, solid-state memories, and optical and magnetic media.

The following examples pertain to further embodiments.

Example 1 is processor comprising: 1) a processing core; 2) a read queue to buffer read requests of the processing core to a non-volatile memory, last level cache (NVM-LLC); 3) a write queue to buffer write requests of the processing core to the NVM-LLC; and 4) a cache controller coupled to the processing core, and to include the read queue and the write queue, the cache controller further to: a) detect whether the write queue is full; b) prioritize a first order of sending requests to the NVM-LLC when the write queue contains an empty slot, the first order specifying a first pattern of sending the read requests before the write requests; and b) prioritize a second order of sending requests to the NVM-LLC in response to a determination that the write queue is full, the second order specifying a second pattern of alternating between sending a write request from the write queue and a read request from the read queue.

In Example 2, the processor of Example 1, wherein the cache controller is further to: a) determine that a most-recent request sent to the NVM-LLC was a read request; and b) send, to the NVM-LLC, a subsequent request from the write queue in response to the determination that the write queue is full.

In Example 3, the processor of Example 1, wherein the cache controller is further to: a) determine a most-recent request sent to the NVM-LLC was a write request; and b) send, to the NVM-LLC, a subsequent request from the read queue in response to a determination that the write queue is full.

In Example 4, the processor of Example 1, wherein the cache controller is further to: a) buffer a liveness score with each write request in the write queue; b) detect the read queue having over a threshold number of read requests; and c) drop, from the write queue, one of the write requests having a lowest liveness score.

In Example 5, the processor of Example 4, wherein the cache controller is further to: a) determine whether a cache line of the one of the write requests is dirty; and b) write the cache line to memory when the one of the write requests is dirty.

Various embodiments may have different combinations of the structural features described above. For instance, all optional features of the computing system described above may also be implemented with respect to the method or process described herein and specifics in the examples may be used anywhere in one or more embodiments.

Example 6 is an integrated circuit: 1) a cache controller comprising: 2) a read queue to buffer read requests to a non-volatile memory, last level cache (NVM-LLC); and 3) a write queue to buffer write requests to the NVM-LLC; and wherein the cache controller is to: a) buffer, in the write queue, a liveness score with each respective write request; b) detect write congestion comprising the write queue being full and the read queue having over a threshold number of read requests; and b) drop, from the write queue, a write request having a lowest liveness score.

In Example 7, the integrated circuit of Example 6, wherein the cache controller is further to: a) determine whether a cache line of the write request is dirty; and b) write the cache line to memory when the write request is dirty.

In Example 8, the integrated circuit of Example 6, wherein the cache controller is further to: a) detect, after the drop of the write request, an empty slot in the write queue; and b) prioritize an order of sending requests to the NVM-LLC, the order specifying a pattern of sending the read requests before the write requests.

In Example 9, the integrated circuit of Example 6, wherein the cache controller is further to prioritize an order of sending requests to the NVM-LLC in response to a determination that the write queue is full, the order specifying a pattern of alternating between sending a write request from the write queue and a read request from the read queue.

In Example 10, the integrated circuit of Example 9, wherein the cache controller is further to: a) determine a most-recent request sent to the NVM-LLC was a read request; and b) send, to the NVM-LLC, a subsequent request from the write queue in response to the determination that the write queue is full.

In Example 11, the integrated circuit of Example 9, wherein the cache controller is further to: a) determine a most-recent request sent to the NVM-LLC was a write request; and b) send, to the NVM-LLC, a subsequent request from the read queue in response to the determination that the write queue is full.

In Example 12, the integrated circuit of claim 6, wherein the liveness score comprises a probability that a cache line will be recalled.

Various embodiments may have different combinations of the structural features described above. For instance, all optional features of the processors and methods described above may also be implemented with respect to a system described herein and specifics in the examples may be used anywhere in one or more embodiments.

Example 13 is a method comprising: 1) buffering, by a cache controller, read requests to a non-volatile memory, last level cache (NVM-LLC) in a read queue; 2) buffering, by the cache controller, write requests to the NVM-LLC in a write queue; 3) prioritizing, by the cache controller, sending the read requests, before the write requests, to the NVM-LLC; and d) responsive to detecting the write queue being full, alternately sending, to the NVM-LLC, a write request from the write queue and a read request from the read queue.

Example 14, the method of Example 13, further comprising: 1) determining a most-recent request sent to the NVM-LLC was a read request; and 2) sending, to the NVM-LLC, a subsequent request from the write queue in response to detecting that the write queue is full.

In Example 15, the method of Example 13, further comprising: 1) determining a most-recent request sent to the NVM-LLC was a write request; and 2) sending next, to the LLC, a subsequent request from the read queue in response to detecting that the write queue is full.

In Example 16, the method of Example 13, further comprising: 1) buffering a liveness score with each write request in the write queue; 2) detecting the read queue having over a threshold number of read requests; and 3) dropping, from the write queue, one of the write requests that has a lowest liveness score.

In Example 17, the method of Example 16, further comprising: 1) determining whether a cache line of the one of the write requests is dirty; and 2) writing the cache line to memory when the one of the write requests is dirty.

Various embodiments may have different combinations of the structural features described above. For instance, all optional features of the processors and methods described above may also be implemented with respect to a system described herein and specifics in the examples may be used anywhere in one or more embodiments.

Example 18 is a method comprising: 1) buffering, by a cache controller, read requests to a non-volatile memory, last level cache (NVM-LLC) in a read queue; 2) buffering, by the cache controller, write requests to the NVM-LLC in a write queue with a corresponding liveness score; 3) detecting, by the cache controller, write congestion comprising the write queue being full and the read queue having over a threshold number of read requests; and 4) dropping, by the cache controller from the write queue, a write request having a lowest liveness score.

In Example 19, the method of Example 18, further comprising: 1) detecting, after the dropping of the write request, an empty slot in the write queue; and 2) prioritizing an order of sending requests to the NVM-LLC, the order specifying a pattern of sending the read requests before the write requests.

In Example 20, the method of Example 18, further comprising prioritizing an order of sending requests to the NVM-LLC in response to a determination that the write queue is full, the order specifying a pattern of alternating between sending a write request from the write queue and a read request from the read queue.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

In the description herein, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of a computer system have not been described in detail in order to avoid unnecessarily obscuring the present disclosure.

The embodiments are described with reference to determining validity of data in cache lines of a sector-based cache in specific integrated circuits, such as in computing platforms or microprocessors. The embodiments may also be applicable to other types of integrated circuits and programmable logic devices. For example, the disclosed embodiments are not limited to desktop computer systems or portable computers, such as the Intel® Ultrabooks™ computers. And may be also used in other devices, such as handheld devices, tablets, other thin notebooks, systems on a chip (SoC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. It is described that the system can be any kind of computer or embedded system. The disclosed embodiments may especially be used for low-end devices, like wearable devices (e.g., watches), electronic implants, sensory and control infrastructure devices, controllers, supervisory control and data acquisition (SCADA) systems, or the like. Moreover, the apparatuses, methods, and systems described herein are not limited to physical computing devices, but may also relate to software optimizations for energy conservation and efficiency. As will become readily apparent in the description below, the embodiments of methods, apparatuses, and systems described herein (whether in reference to hardware, firmware, software, or a combination thereof) are vital to a 'green technology' future balanced with performance considerations.

Although the embodiments herein are described with reference to a processor, other embodiments are applicable to other types of integrated circuits and logic devices. Similar techniques and teachings of embodiments of the present disclosure can be applied to other types of circuits or semiconductor devices that can benefit from higher pipeline throughput and improved performance. The teachings of embodiments of the present disclosure are applicable to any processor or machine that performs data manipulations. However, the present disclosure is not limited to processors or machines that perform 512 bit, 256 bit, 128 bit, 64 bit, 32 bit, or 16 bit data operations and can be applied to any processor and machine in which manipulation or management of data is performed. In addition, the description herein provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the above examples describe instruction handling and distribution in the context of execution units and logic circuits, other embodiments of the present disclosure can be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions can be used to cause a general-purpose or special-purpose processor that is programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Alternatively, operations of embodiments of the present disclosure might be performed by specific hardware components that contain fixed-function logic for performing the operations, or by any combination of programmed computer components and fixed-function hardware components.

Instructions used to program logic to perform embodiments of the disclosure can be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'to,' 'capable of/to,' and/or 'operable to,' in one embodiment, refers to some apparatus, logic, hardware, and/or element designed in such a way to enable use of the apparatus, logic, hardware, and/or element in a specified manner. Note as above that use of 'to,' 'capable to,' or 'operable to,' in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like. The blocks described herein can be hardware, software, firmware or a combination thereof.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "defining," "receiving," "determining," "issuing," "linking," "associating," "obtaining," "authenticating," "prohibiting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Also, the terms "first," "second," "third," "fourth," etc. as used herein are meant as labels to distinguish among different elements and may not necessarily have an ordinal meaning according to their numerical designation.

What is claimed is:

1. A processor comprising:
 a processing core;
 a read queue to buffer read requests of the processing core to a non-volatile memory, last level cache (NVM-LLC);
 a write queue to buffer write requests of the processing core to the NVM-LLC; and
 a cache controller coupled to the processing core, and to include the read queue and the write queue, the cache controller further to:
  buffer a liveness score with each write request in the write queue;
  detect write congestion comprising the write queue being full and the read queue having over a threshold number of read requests, the threshold number being derived from a combination of write latency to the NVM-LLC and a turn-around time of fetching a cache line from main memory; and
  drop, from the write queue, one of the write requests having a lowest liveness score in response to detection of the write congestion.

2. The processor of claim 1, wherein the cache controller is further to prioritize an order of sending requests to the NVM-LLC in response to a determination that the write queue is full, the order specifying a pattern of alternating between sending a write request from the write queue and a read request from the read queue.

3. The processor of claim 2, wherein the cache controller is further to:
 determine that a most-recent request sent to the NVM-LLC was a read request; and
 send, to the NVM-LLC, a subsequent request from the write queue in response to a determination that the write queue is full.

4. The processor of claim 2, wherein the cache controller is further to:
 determine a most-recent request sent to the NVM-LLC was a write request; and
 send, to the NVM-LLC, a subsequent request from the read queue in response to a determination that the write queue is full.

5. The processor of claim 1, wherein the cache controller is further to:
 determine whether a cache line of the one of the write requests is dirty; and
 write the cache line to memory when the one of the write requests is dirty.

6. An integrated circuit comprising:
 a cache controller comprising:
  a read queue to buffer read requests to a non-volatile memory, last level cache (NVM-LLC); and
  a write queue to buffer write requests to the NVM-LLC; and
 wherein the cache controller is to:
  buffer, in the write queue, a liveness score with each respective write request;
  detect write congestion comprising the write queue being full and the read queue having over a threshold number of read requests, the threshold number being derived from a combination of write latency to the NVM-LLC and a turn-around time of fetching a cache line from main memory; and
  drop, from the write queue, a write request having a lowest liveness score in response to detection of the write congestion.

7. The integrated circuit of claim 6, wherein the cache controller is further to:
 determine whether a cache line of the write request is dirty; and
 write the cache line to memory when the write request is dirty.

8. The integrated circuit of claim 6, wherein the cache controller is further to:
 detect, after the drop of the write request, an empty slot in the write queue; and
 prioritize an order of sending requests to the NVM-LLC, the order specifying a pattern of sending the read requests before the write requests.

9. The integrated circuit of claim 6, wherein the cache controller is further to prioritize an order of sending requests to the NVM-LLC in response to a determination that the write queue is full, the order specifying a pattern of alternating between sending a write request from the write queue and a read request from the read queue.

10. The integrated circuit of claim 9, wherein the cache controller is further to:
 determine a most-recent request sent to the NVM-LLC was a read request; and
 send, to the NVM-LLC, a subsequent request from the write queue in response to the determination that the write queue is full.

11. The integrated circuit of claim 9, wherein the cache controller is further to:
 determine a most-recent request sent to the NVM-LLC was a write request; and
 send, to the NVM-LLC, a subsequent request from the read queue in response to the determination that the write queue is full.

12. The integrated circuit of claim 6, wherein the liveness score comprises a probability that a cache line will be recalled.

13. A method comprising:
 buffering, by a cache controller, read requests to a non-volatile memory, last level cache (NVM-LLC) in a read queue;
 buffering, by the cache controller, write requests to the NVM-LLC in a write queue;
 buffer, by the cache controller, a liveness score with each write request in the write queue;
 detecting, by the cache controller, write congestion comprising the write queue being full and the read queue having over a threshold number of read requests, the threshold number being derived from a combination of write latency to the NVM-LLC and a turn-around time of fetching a cache line from main memory; and dropping, from the write queue by the cache controller, one of the write requests having a lowest liveness score in response to detection of the write congestion.

14. The method of claim 13, further comprising:

prioritizing, by the cache controller, sending the read requests, before the write requests, to the NVM-LLC; and responsive to detecting the write queue being full, alternately sending, to the NVM-LLC, a write request from the write queue and a read request from the read queue.

15. The method of claim 14, further comprising:

determining a most-recent request sent to the NVM-LLC was a read request; and sending, to the NVM-LLC, a subsequent request from the write queue in response to detecting that the write queue is full.

16. The method of claim 14, further comprising:

determining a most-recent request sent to the NVM-LLC was a write request; and sending next, to the LLC, a subsequent request from the read queue in response to detecting that the write queue is full.

17. The method of claim 14, further comprising:

determining whether a cache line of the one of the write requests is dirty; and writing the cache line to memory when the one of the write requests is dirty.

18. A method comprising:

buffering, by a cache controller, read requests to a non-volatile memory, last level cache (NVM-LLC) in a read queue;

buffering, by the cache controller, write requests to the NVM-LLC in a write queue with a corresponding liveness score;

detecting, by the cache controller, write congestion comprising the write queue being full and the read queue having over a threshold number of read requests, the threshold number being derived from a combination of write latency to the NVM-LLC and a turn-around time of fetching a cache line from main memory; and dropping, by the cache controller from the write queue, a write request having a lowest liveness score in response to detection of the write congestion.

19. The method of claim 18, further comprising:

detecting, after the dropping of the write request, an empty slot in the write queue; and prioritizing an order of sending requests to the NVM-LLC, the order specifying a pattern of sending the read requests before the write requests.

20. The method of claim 18, further comprising prioritizing an order of sending requests to the NVM-LLC in response to a determination that the write queue is full, the order specifying a pattern of alternating between sending a write request from the write queue and a read request from the read queue.

* * * * *